Jan. 27, 1948.  J. MARTIN  2,435,046
RELIEVING MACHINE
Filed Sept. 12, 1945  6 Sheets-Sheet 1

INVENTOR.
James Martin.
BY
Harness, Dickey & Pierce.
ATTORNEYS.

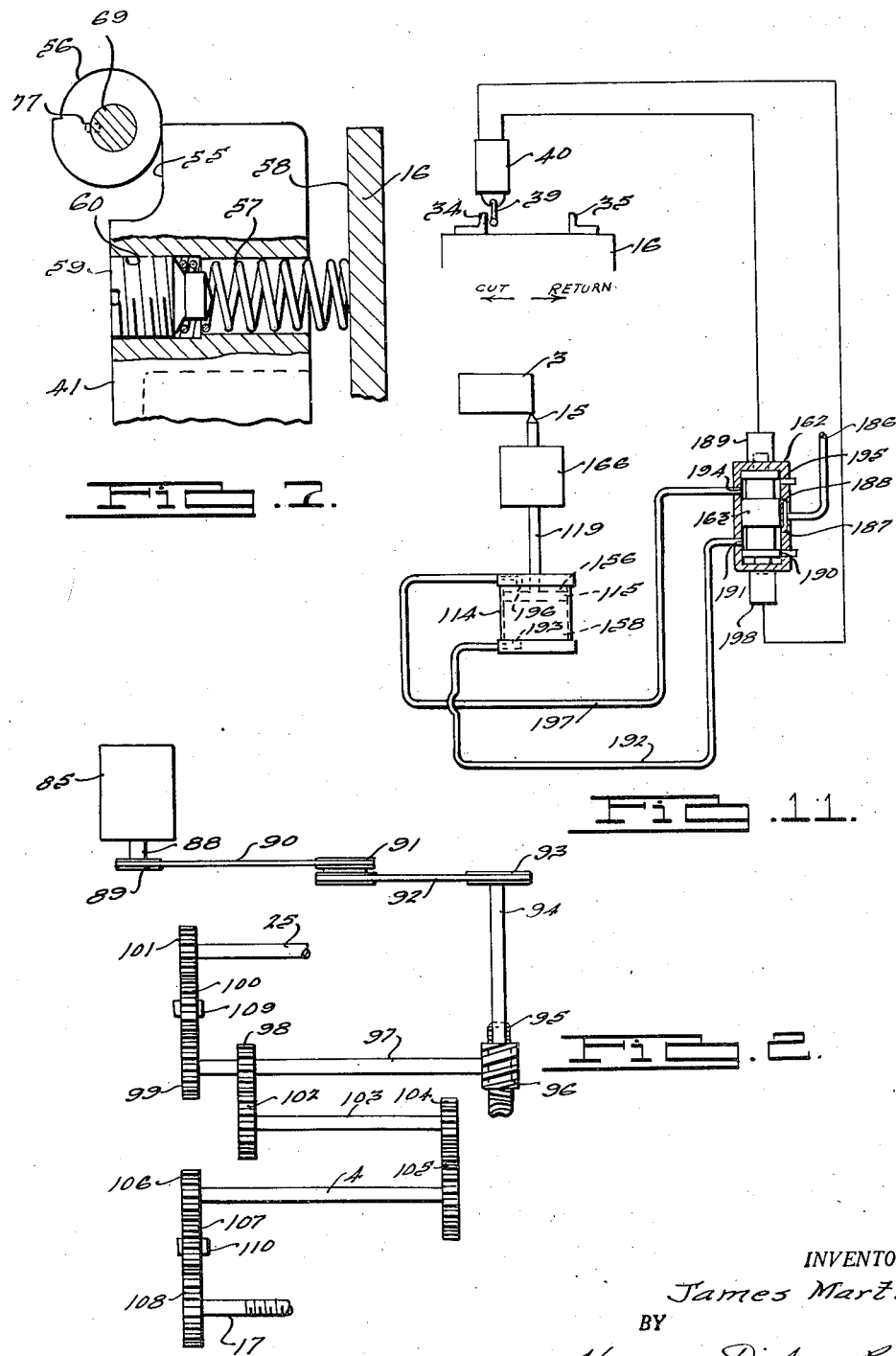

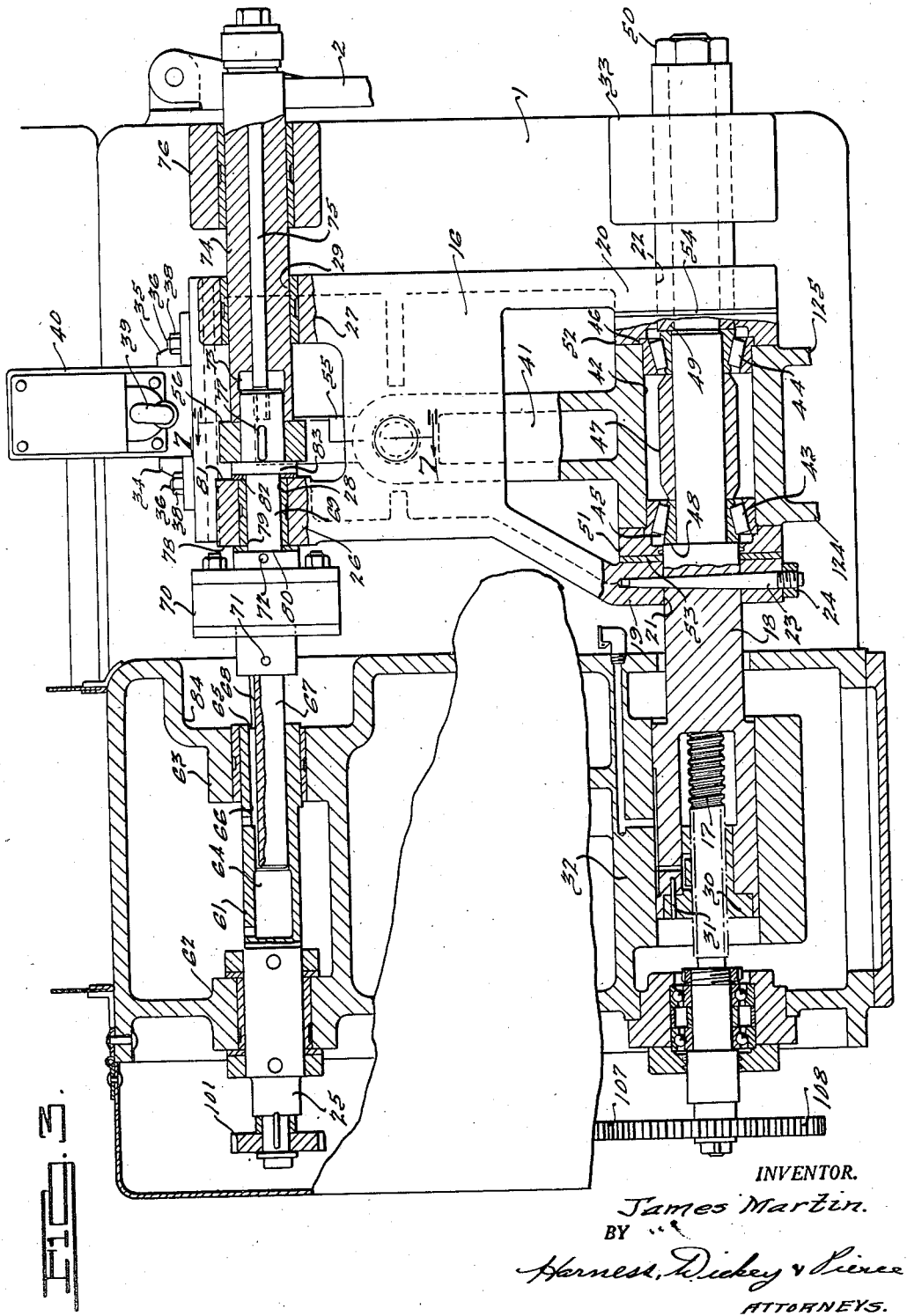

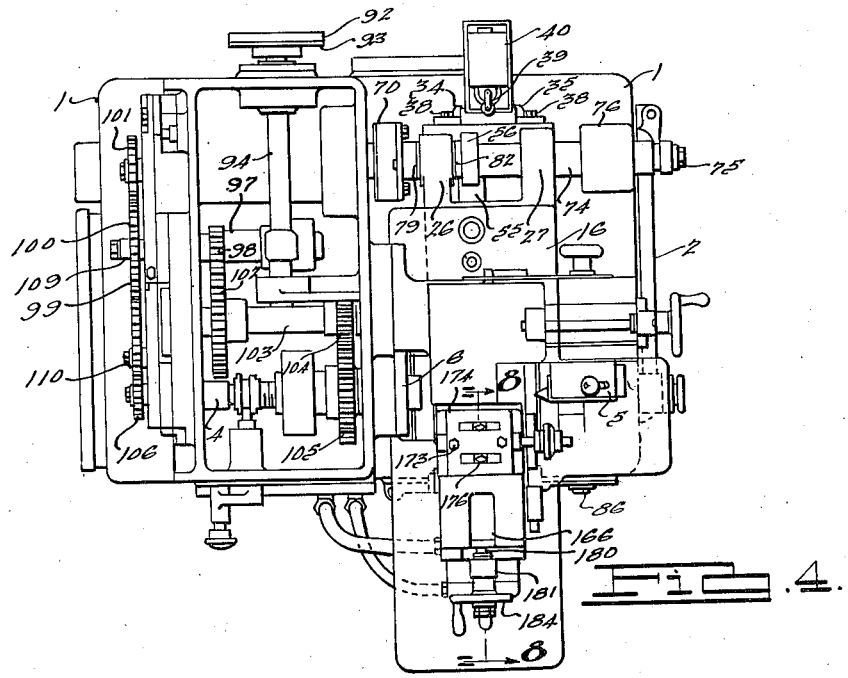
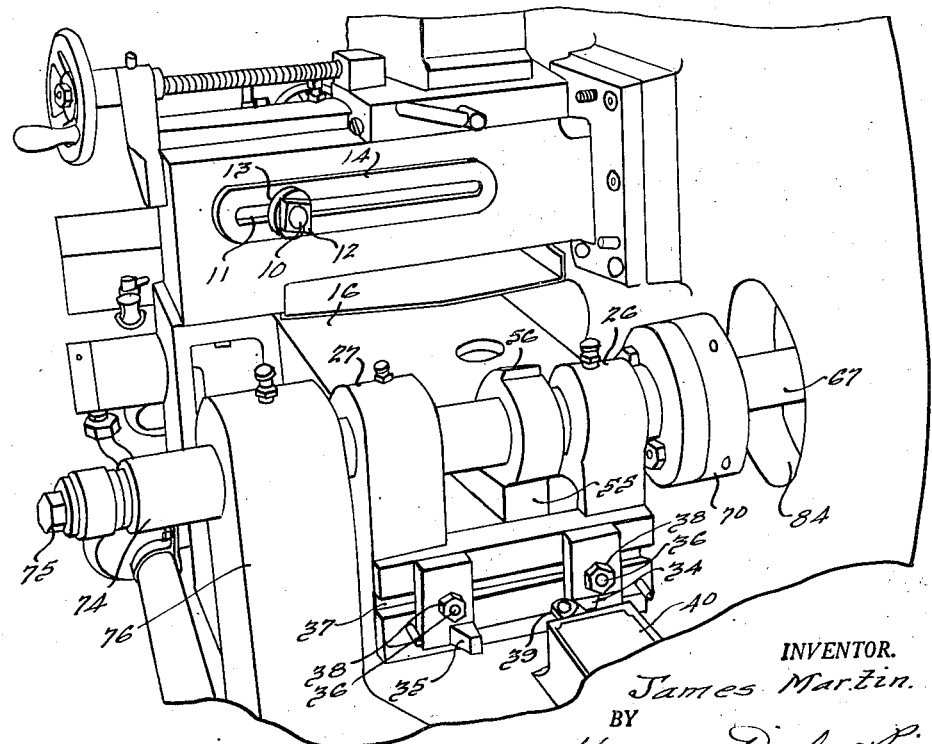

Jan. 27, 1948.    J. MARTIN    2,435,046
RELIEVING MACHINE
Filed Sept. 12, 1945    6 Sheets-Sheet 5

INVENTOR.
James Martin.
BY
Harness, Dickey & Pierce
ATTORNEYS.

Jan. 27, 1948. J. MARTIN 2,435,046
RELIEVING MACHINE
Filed Sept. 12, 1945 6 Sheets-Sheet 6
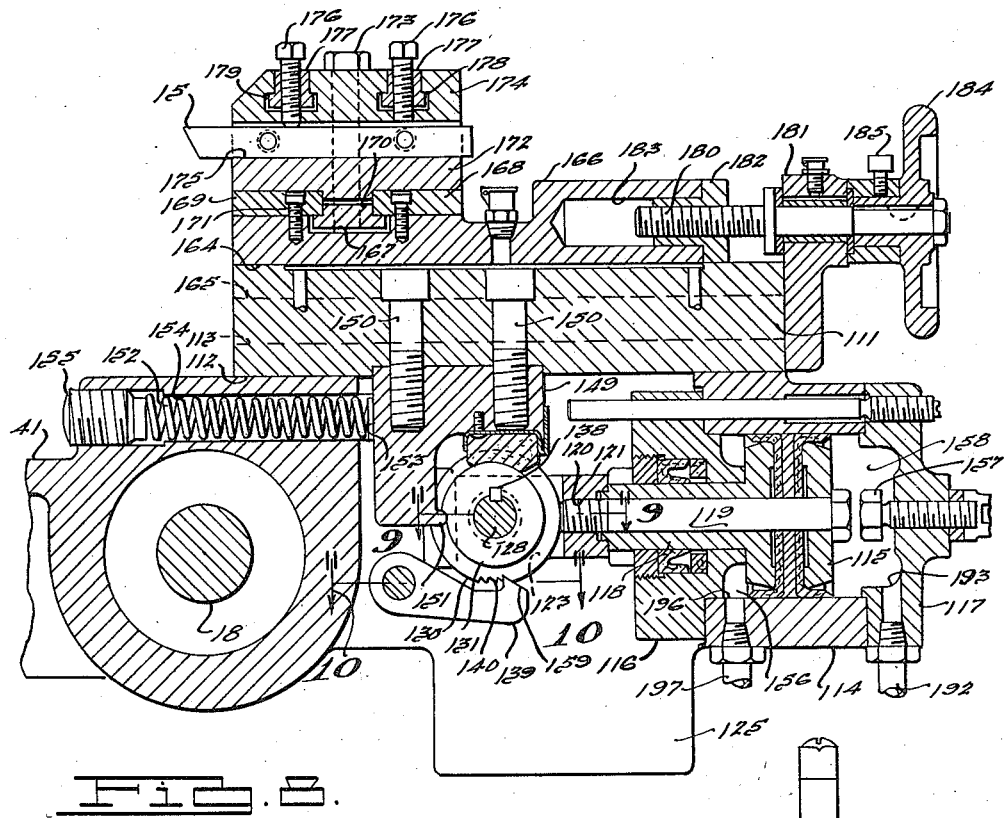
INVENTOR.
James Martin.
BY
Harness, Dickey & Pierce
ATTORNEYS.

Patented Jan. 27, 1948

2,435,046

UNITED STATES PATENT OFFICE 2,435,046

RELIEVING MACHINE

James Martin, Ferndale, Mich., assignor to Michigan Tool Company, Detroit, Mich., a corporation of Delaware Application September 12, 1945, Serial No. 615,792

4 Claims. (Cl. 82—19)

This invention relates generally to machine tools and more particularly to a substantially automatic machine for cutting the relief on the flanks of the cutting teeth of a hob or similar tool.

As is well recognized, gear cutting hobs and similar tools are usually sharpened by grinding the front faces of the teeth. The intersection of this ground front face of each tooth with the flanks thereof provides the cutting edges of each tooth. Consequently, the precision and uniformity with which the flanks of the teeth are generated largely controls the accuracy of the finished tool.

In order that the cutting edges of the hob will cut properly, it is essential that the flanks of each tooth be relieved or backed off to provide the proper relief or clearance behind the cutting edges.

Accordingly, it is the primary object of the present invention to provide a simple, highly accurate machine for automatically cutting the flanks of the teeth of a hob to the desired form.

Another object of this invention is to provide for uniformly and evenly relieving hob teeth by arcuately moving the cutting tool as it engages said teeth. In order to achieve this result, the present invention contemplates a rocking table means for thus moving said tool as it engages said teeth.

Another object of the invention is to provide, in a machine of the type mentioned, simple means for accurately and automatically feeding the cutting tool. In order to accomplish this result, the present invention contemplates means for positively locating the cutting tool during the entire cutting operation.

Another object of this invention is to provide novel and improved means for adjusting the cutting tool in preparation for the next cut simultaneously with the retraction of the cutting tool at the end of the hob lead so that upon return to its initial position it may immediately begin the next cut without further adjustment. In order to accomplish this result, the present invention contemplates automatic means which in no wise depends upon the ability or skill of the operator.

A further object of this invention is to provide a novel and improved construction of this type, requiring but minor adjustment to be adapted to apply relief to teeth of cutting hobs having a range of leads and varied numbers of flutes.

A still further object of the invention is to provide novel and improved means for automatically stopping the machine after the relieving operation is completed and which does not require the presence of the operator.

Other objects of this invention will become apparent from the following specification, from the drawings relating thereto, and the claims hereinafter set forth.

In the drawings, in which like numerals indicate like parts wherever indicated:

Figure 2 is a diagrammatic sketch showing the driving means which may be used to drive the machine shown in Figure 1.

Figure 3 is a partially sectional plan view of the carriage and rocking table with other parts omitted.

Figure 4 is a plan view of the relieving machine shown in Figure 1 with the covering over the gearing and shafting removed.

Figure 5 is a partial perspective of the rear of the machine of my invention with the cam for rocking the toolholder shown.

Figure 7 is a section on line 7—7 of Figure 3 to show the spring means for holding the rocking table against the rocking cam.

Figure 8 is a sectional view on line 8—8 of Figure 4 showing the means for retracting and resetting the toolholder.

Fig. 9 is a section on line 9—9 of Figure 8 showing the adjusting cam and ratchet means.

Figure 10 is a section on line 10—10 of Figure 8 to show the pawl and supporting means therefor.

Figure 11 is a diagrammatic sketch showing a pressure responsive system which may be used with a machine embodying my invention.

Figure 1:
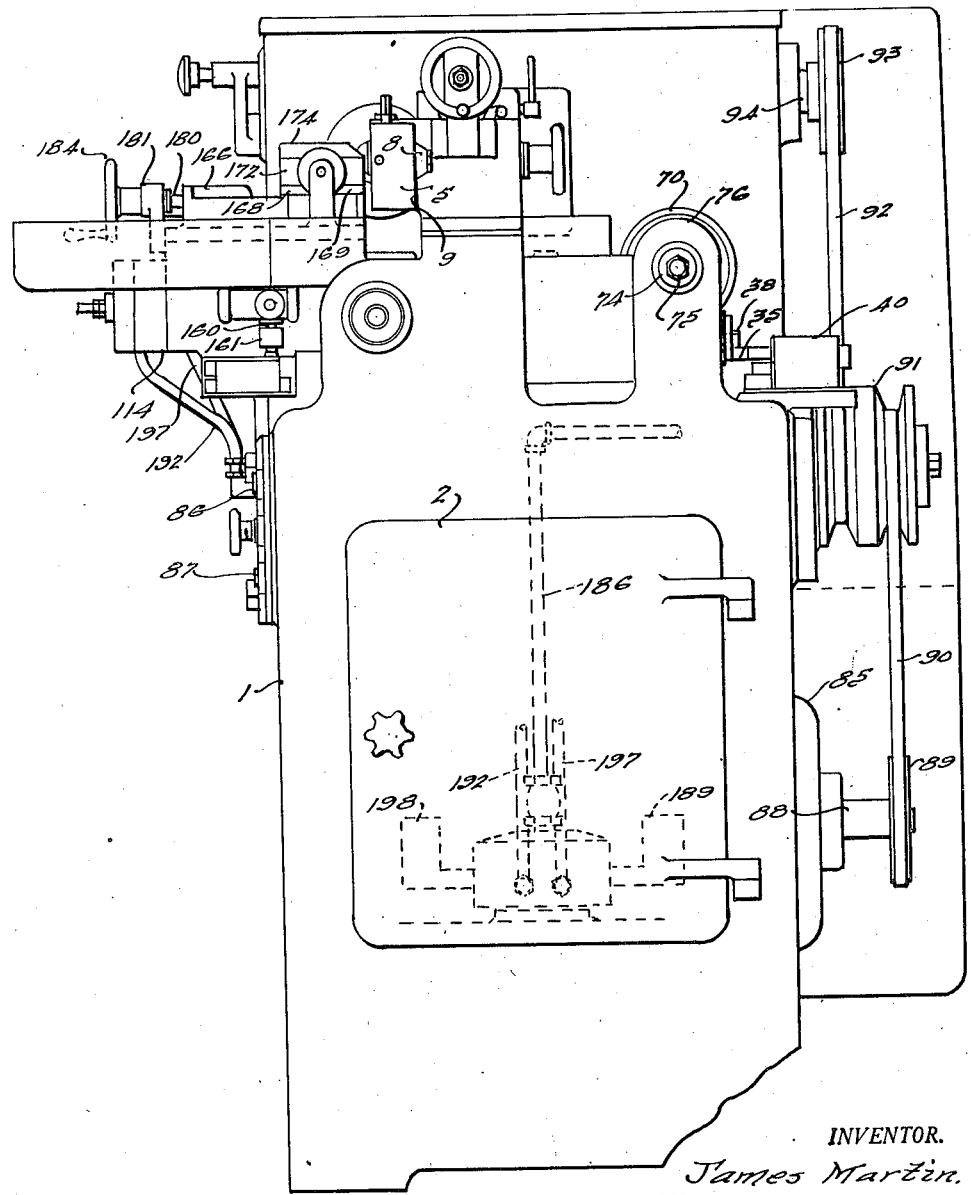
Figure 1 is a side elevational view of a relieving machine embodying the improvements of the present invention.
Figure 6:
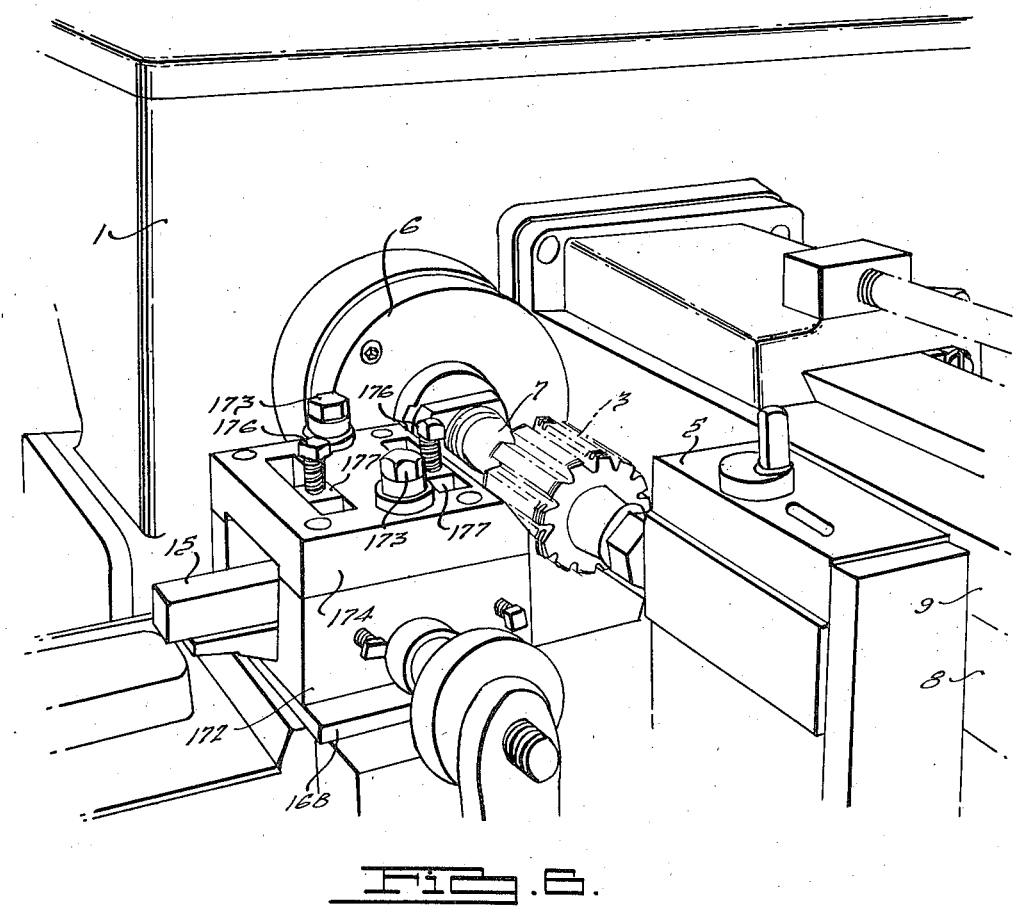
Figure 6 is a perspective view showing a cutting hob mounted on the spindle preparatory to engagement with the cutting tool.

According to the present invention, a construction is provided whereby a hob, rotatably mounted, is engaged by a cutting tool which moves in a direction parallel to the axis of rotation of said hob. Provision is made for rocking the cutting tool arcuately about an axis parallel to the axis of rotation of the hob as the tool engages each tooth thereon. Upon reaching the end of the lead of the hob, the cutting tool is simultaneously reciprocated to a retracted position and reset for the next cut. A carriage then returns the tool to an initial or starting point where it is reciprocated out of the retracted position for engagement with the hob and the operation repeated.

At the termination of the operation, the cutting tool is returned to an initial or starting position and the driving motor is automatically stopped.

For a more detailed description of the invention reference may be had to the drawings, in which a base is generally indicated at 1. Such base is a generally integral, hollow casting which forms a base or pedestal for supporting the relieving machine. A door 2 permits access to certain of the apparatus, hereinafter described, housed interiorly of said base.

The machine provides for rotatably supporting a hob 3, by means of a spindle 4 and a tail stock 5.

This spindle 4 is journaled for rotation in a suitable bearing 6 on an upper portion of base 1 and is adapted to receive one end of arbor 7 upon which said hob 3 is mounted during the relieving operation. In this manner, the rotation of spindle 4 is imparted to the workpiece.

The tail stock 5 is adjustably mounted on an upwardly directed portion of base 1. Adjustment is provided to enable a relieving machine of my invention to accommodate a workpiece of considerable length. Such adjustment is accomplished by moving said tail stock 5 in slideway 8 provided by machined surface 9 on such upwardly directed portion of base 1.

After locating said tail stock 5 in this manner, the same may be rigidly locked in position by means of bolt 10, which extends through slot 11, threadably receiving nut 12 (Figure 5). It will be apparent that tightening such nut 12 will cause washer 13 to press upon boss 14 around slot 11, rigidly locking said tail stock in predetermined adjusted position.

In order to accomplish reciprocation of the cutting tool 15 parallel to the axis of rotation of the hob during the relieving operation, a carriage 16 is provided to be reciprocated by means of feed screw 17.

Such carriage 16 is supported by shaft means at each end thereof. At one end said carriage is supported on slidable shaft 18 by means of sides 19 and 20 extending downwardly from said carriage with aligned openings 21 and 22 therethrough, through which such slidable shaft 18 is permitted to extend. A tapered pin 23 passing through mating openings in side 19 and shaft 18 secures said carriage to said slidable shaft. It is pointed out that this pin 23 threadably engages a nut 24 at its one extremity which may be turned to withdraw this pin when it is desired to remove either shaft 18 or carriage 16.

At its opposite end, the carriage depends from an integrated cam shaft generally indicated at 25. Ear-like projections upwardly directed from the carriage form bearings 26 and 27 with aligned openings 28 and 29 through which shaft 25 extends.

In order to provide for this reciprocation of carriage 16 by means of feed screw 17, slidable shaft 18 has a lead nut 30 pinned at 31 thereto for threadably engaging said feed screw. It will be observed that as such feed screw is rotated, shaft 18 will slidably move in bearings 32 and 33 provided by base 1. Thus, it is quite obvious that carriage 16 will be shifted therewith inasmuch as said carriage is pinned to said slidable shaft.

Automatic reciprocation is accomplished by means of dogs 34 and 35 adjustably secured to carriage 16 by means of T-bolts 36, slidable in T-slot 37 of said carriage, and nuts 38. Said dogs contact arm 39 of a limit switch 40 as each reaches its respective terminal limit of travel, effecting the reversal of a driving motor and driving mechanism later to be described. This, of course, effects the rotation of the feed screw and brings about the reciprocation of the carriage.

This reciprocation of carriage 16 is imparted to table 41 which is bracketed within the downwardly extending sides of the carriage. Such table is provided to arcuately rock cutting tool 15 about an axis parallel to the axis of rotation of the workpiece as said tool traverses the lead on the workpiece.

Table 41 has an annular opening 42 through which shaft 18 passes. The outer races of tapered bearing assemblies 43 and 44 are pressed into the opposite extremities of such annular opening and annular shoulders 45 and 46 on said races abut the edges of the boss through which the annular opening is formed. The inner races of said bearings mounted upon shaft 18 are separated by means of spacer 47. Thus, table 41 is pivotally supported by said shaft. The inner race of bearing 43 abuts shoulder 48 of shaft 18; and the inner race of bearing 44 abuts annular, removable spacer 49 held firmly in place by bolt 50 which threadably engages shaft 18. The outer races of said bearing assemblies are telescopically received in annular spacers 51 and 52 abutting the boss in which annular opening 42 is formed. Such spacers abut annular washers 53 and 54 which in turn abut sides 19 and 20 respectively of carriage 16. In this manner, table 41 is securely bracketed within said downwardly extending sides and compelled to reciprocate therewith.

Rocking of table 41 is accomplished as a cam follower 55, formed at the opposite end of said table, contacts the surface of a cam 56 rotatably supported by cam shaft 25. In order to distinguish between this cam and another, to be hereinafter described, I term cam 56 a rocking cam. By means of compression spring 57 (Figure 7), which bears upon a lower surface portion 58 of carriage 16, cam follower 55 of table 41 is held against rocking cam 56. A screw 59 threadably engaging tapped opening 60 of table 41 may be turned to adjust the pressure of follower 55 against cam 56 for satisfactory operation. From the description, it will be clear that as the cam is rotated, table 41 will rock about shaft 18.

Inasmuch as table 41 reciprocates with carriage 16 in a direction parallel to the axis of rotation of the hob, it is quite obvious that rocking cam 56 must also be reciprocated therewith in order to maintain contact between said cam 56 and follower 55.

In order to provide for reciprocating cam 56 in such manner, cam shaft 25 is an integrated unit. One end of this unit is formed by shaft 61 which is driven by the driving means to be later described. Such shaft is journaled for rotation in bearings 62 and 63 upwardly directed from base 1 and has a hollow portion 64 with keyway 65 milled therein for keys 66, one of which is shown (Figure 3). A shaft 67, with spline 68 thereon, is received for registry between keys 66. At its opposite end shaft 67 is connected to shaft 69 by means of one-way clutch 70 interposed between said shafts. Such clutch is pinned at 71 to shaft 67 and at 72 to shaft 69. Shaft 69 is telescopically received by the hollow end 73 of shaft 74 and secured thereto by bolt 75, extending axially through such shaft 74 to be threadably received by a tapped opening in the adjacent end of shaft 69. Such shaft 74 is journaled for rotation in bearing 76 upwardly directed from base 1.

It will be observed that as shaft 61 is rotated, the integrated cam shaft is rotated by virtue of the association afforded by keys 66 and spline 68. It is pointed out, however, that the unit rotates rocking cam 56, keyed thereto at 77, in one direction only. One-way clutch 70 prevents reverse rotation of that portion of the unit to which said clutch is fixed when the driving mechanism is reversed, during reciprocation of carriage 16, in order to prevent injury to said cam.

By means of integral, upwardly-directed bearing 26, the carriage effects the reciprocation of cam follower 55. As such carriage travels in one direction, face 78 of such bearing forcibly presses annular spacer 79 against the face of annular collar 80 of clutch 70, compelling that portion of the integrated cam shaft 25 to which shaft 67 is connected, to slidably move in a similar direction. When said carriage travels in an opposite direction, face 81 thereof forcibly presses annular spacer 82 against the face of shoulder 83 on shaft 69 to slidably move the slidable portion of the camshaft in a similar direction. Thus, cam 56 and follower 55 are constantly maintained in line.

It will be appreciated that in order for cam 56 to be thus reciprocated, this slidable portion of camshaft 25 must slide in the hollow portion of shaft 61 and clearance such as provided by depression 84 is required for clutch 70.

It will be further appreciated that cam 56 may be conveniently changed by removing bolt 75 and withdrawing shaft 74 from the end of shaft 69, making said cam accessible for removal.

Up to this point the driving means has been referred to, but not described. In order to provide for the rotation of spindle 4, feed screw 17 and cam 56 in timed relationship, a suitable prime mover in the form of electric motor 85 is supported at a lower rear part of base 1. Electric current may be supplied from a convenient source to be controlled by means of start button 86 and stop button 87. Such motor 85 drives motor shaft 88, pulley 89, continuous belt 90, double pulley 91, continuous belt 92, pulley 93, and shaft 94 with worm 95 thereon. Worm 95 meshes worm gear 96 which drives shaft 97, gear 98 and gear train 99, 100, 101, to drive shaft 61 of integrated camshaft 25 and thus cam 55. Gear 98 on shaft 97 meshes gear 102, driving shaft 103 and gear 104. Such gear 104 meshes gear 105, driving spindle 4 and gear train 106, 107, 108 to drive feed screw 17.

Gears 100 and 107 may be changed to adapt the machine for variation in the number of flutes appearing on the hob or the lead thereof. It is quite obvious that upon replacing said gear with others having a greater or lesser number of teeth, their respective gear train will be affected, affecting in turn, the timed relationship with which camshaft 25 and feed screw 17 rotate with respect to spindle 4. The use of this simple expedient permits a relieving machine of my invention to be adapted for applying relief on teeth of hobs having varied leads and numbers of flutes.

It is to be noted that change gears 100 and 107 rotate upon shafts 109 and 110 respectively. Provision is made for varying the position of said shafts to accommodate the gear thereon in order that such gear may properly mesh in its respective gear train.

Upon reaching the end of the lead of the hob, the cutting tool is retracted out of engagement therewith and simultaneously reset for a new cut. It is then returned to its starting position by carriage 16, as previously described, when said tool is protracted into engagement with the hob and a new cut is begun.

In order to accomplish this reciprocation and resetting of the cutting tool, a tool support 111 is slidably mounted upon machined surface 112 and slideway 113 of rocking table 41. A cylinder 114, containing pressure actuated piston 115, is anchored to depend from said tool support. This cylinder is provided with caps 116 and 117. Piston rod 118, attached to piston 115 for reciprocation therewith, extends through said cap 116. A bolt 119 is permitted to extend through mating openings provided by such piston and piston rod to threadably engage a tapped opening 120 in yoke 121, anchoring said yoke to the adjacent abutting end of piston rod 118. This yoke is slidably supported in slots 122 and 123 in the downwardly-directed sides 124 and 125, respectively, of table 41. Such yoke provides aligned openings 126 and 127 through which shaft 128, rotatably supporting ratchets 129 and 130 and reset cam 131, is permitted to extend. This shaft is secured in said openings by a shoulder 132 which abuts face 133 of said yoke and nut 134 threadably engaging said shaft at its opposite end to abut face 135 of the yoke. The ratchets with the reset cam therebetween occupy the space between arms 136 and 137 of the yoke and are integrally connected to shaft 128 by means of an elongated key 138 in such manner that the entire unit may be rotated by the ratchets.

This rotation is accomplished by a pawl 139 which engages the serrations 140 of the ratchets. Such pawl is pinned at 141 to shaft 142 which is supported in sides 124 and 125 of table 41. The pawl is held in line with the ratchets by means of annular spacer 143 surrounding shaft 142 and torsion spring 144, which spring forcibly holds the pawl in engagement with the serrations of the ratchets. End 145 and end 146 of such spring enter drilled openings in the pawl and annular collar 147, pinned at 148 to the shaft 142, for thus forcibly holding the pawl.

A follower 149 is anchored to depend from the tool support by bolts 150. Such follower has a rounded tip 151 which is forcibly caused to engage the surface of reset cam 131 by means of compression spring 152 pressing upon face 153 of the follower. This compression spring is retained within an annular opening 154 provided in table 41 by a screw 155 which is threadably received in a tapped portion of said opening. It will be apparent that the force with which such spring bears upon the face of the follower may be varied by means of screw 155.

It will now be observed that as chamber 156 of the cylinder is pressurized to move the piston in a direction away from hob 3, the ratchets and cam will similarly move and this movement will effect the rotation of said ratchets and cam by virtue of the engagement of the pawl with the serrations of said ratchets. Simultaneously spring 152, pressing upon follower 149 retracts tool slide 111, keeping the tip of such follower in contact with the reset cam. However, the net retraction of the tool slide is the distance travelled by the piston less that recovered by the rotation of the cam as it will be clear that the retraction of the tool slide is retarded by the rotation of such cam. Therefore, it may be said the cutting tool is simultaneously retracted and reset for the next cut.

The movement of piston 115 is accurately controlled by means of bolt 157 threadably received in a tapped opening of cap 117 of cylinder 114. Such bolt provides a stop which arrests the reciprocating movement of piston 115 and may be turned to increase or decrease the extent of such reciprocation.

After carriage 16 returns the tool support 111 to its initial position, chamber 158 of the cylinder is pressurized, moving the piston in a direction toward the hob. It is to be noted that when movement occurs in this direction, the reset cam is not rotated as the serrations of the ratchets slide on the inclined surface 159 of the pawl and that such movement effects movement of the tool slide in a similar direction due to the contact between the cam and follower, thus compressing spring 152. It is also pointed out that the cam is locked by means of the pawl and ratchets against further rotation until the next reciprocating movement occurs. It is obvious that as the tool support is protracted toward the hob, the extent of such protraction equals that of the piston, but in view of the fact it was not retracted an equal amount, the cutting tool will be closer to the hob than before retraction and thus will be in position for a new cut.

When this reset cam completes one revolution, the relieving operation is complete and pin 160 positioned at an end of shaft 128 to be rotated thereby, as said shaft is rotated by the ratchets 129 and 130, contacts switch 161 (Figure 1) which effects the stopping of the driving motor upon return of the carriage to its initial position.

Automatic reciprocation of the tool carriage into and out of a retracted position is accomplished by means of the previously described dogs 34 and 35 and limit switch 40. In addition to reversing the direction of rotation of driving motor 83, such limit switch actuates a solenoid valve 162 as it is contacted by said dogs. This valve shifts a piston 163 in said valve which alternately pressurizes chambers 156 and 158 of cylinder 114 for reciprocating the piston as described.

The tool support 111 provides a machined surface 164 and slideway 165 upon which a tool slide 166 is slidably mounted. Such slide has groove 167 therein which is partly covered by plates 168 and 169 in such manner as to retain T-nut 170 when such plates are secured to the slide by bolts 171. A toolholder 172 is rigidly mounted on the tool slide by means of bolts 173. Said bolts extend through mating openings in cap 174 and toolholder 172 to be threadably received by the T-nut 170 and upon being tightened positively hold the toolholder on the tool-slide. Cap 174 covers a slot 175 in which the cutting tool 15 is retained by means of bolts 176 which are threadably received by T-nuts 177 positioned in T-slots 178 and 179 of said cover.

In order to initially position the cutting tool, this tool slide may be slidably moved in a direction perpendicular to the axis of rotation of the hob by means of feed screw 180. Such feed screw is journaled for rotation in a suitable bearing 181 anchored to one end of the tool support. A lead nut 182 pressed into opening 183 of the tool slide threadably engages such feed screw and it will be appreciated that as such feed screw is rotated, the tool slide will shift. A conveniently accessible handwheel 184 integrally connected to the feed screw provides for rotating the same.

After the cutting tool is thus initially positioned, it may be locked positively and securely in position by means of a set-screw 185 which prevents further rotation of the handwheel.

In order to accomplish the reciprocation of the tool support into and out of engagement with the hob as described a pneumatic system is provided. Figure 11 shows the system with the cutting tool positioned to engage the hob. As previously explained, valve 162 is a solenoid valve actuated by limit switch 40 upon contact by dogs 34 and 35 on the carriage 16. Thus, as shown in Figure 11, pneumatic pressure is supplied by supply line 186 to ports 187 and 188 and upon contact by dog 34 the limit switch effects shifting of piston 163 by means of solenoid 189, closing exhaust port 190 and opening port 187 to port 191, line 192, port 193 and chamber 158 of cylinder 114, protracting the cutting tool into engagement with the hob.

Simultaneously, port 188 is closed to port 194 while exhaust port 195 is open thereto to permit air exhausted from chamber 156 of said cylinder to escape by way of port 196, line 197 and port 194 and thence to the atmosphere through said exhaust port.

When dog 35 contacts said limit switch, solenoid valve 189 causes piston 163 to shift again, opening port 188 to port 194 and close exhaust port 195 thereto. At the same time, port 187 is closed to port 191 while exhaust port 190 is open thereto, and piston 115 moves away from the hob, permitting the compression spring 152 to effect retraction of the cutting tool.

While I have shown and described a pneumatic system for effecting reciprocation of piston 115, it will be apparent to those skilled in the art that such reciprocation might well be accomplished by hydraulic or mechanical means and it is not intended that the invention be thus limited.

It will be clear from the foregoing description that the relieving machine shown in the drawings and described above has been illustrated and described in rather specific detail. Obviously, many modifications, changes, and departures from the above-described construction may be made without departing from the generic spirit and scope of the invention as set forth in the subjoined claims.

What is claimed is:

1. In a hob tooth flank relieving machine, a base, a reciprocable tool support mounted thereon for mounting a toolholder for movement into and out of a retracted position, a cam follower depending from said tool support, a releasable compression spring to move said tool support and cutting tool thereon to a retracted position, a pressure responsive piston for releasing said spring and compacting the same upon returning the tool support from a retracted position, a rotating ratchet and cam integrally secured to a shaft operatively associated with said pressure responsive piston; said cam follower engaging the surface of said cam continuously to simultaneously with the retracting movement reset the cutting tool for the next cut; said ratchet engaging a pawl causing said ratchet and cam to be rotated and locking the cutting tool in reset position, and means for automatically actuating said pressure responsive means.

2. In a hob tooth flank relieving machine, a base, a reciprocable tool support mounted thereon for supporting a toolholder for movement from and to a retracted position, a cam follower depending from said tool support, a releasable compression spring to move said tool support and cutting tool thereon to a retracted position, a pressure responsive piston for releasing said spring and compacting the same upon returning the tool support from a retracted position, a reciprocable, integral cam and ratchet operatively associated with said pressure responsive piston, said cam follower engaging the surface of said cam to simultaneously with the retracting movement reset the cutting tool for the next cut, said ratchet engaging a pawl causing the cam to be rotated and locking the cutting tool in reset position, and means for automatically actuating said pressure responsive means.

3. In a hob tooth flank relieving machine, a base, a reciprocable tool support mounted thereon for mounting a toolholder for reciprocation into and out of a retracted position, said toolholder adapted to retain a cutting tool, a cam follower depending from said tool support, compression spring means to move said tool support and cutting tool thereon to a retracted position, pressure responsive means for releasing said spring means and compacting the same upon returning said cutting tool from the retracted position, an integral cam and ratchet means operatively associated with said pressure responsive means, said cam follower engaging the surface of said cam to simultaneously with the retracting movement reset the tool support and cutting tool thereon for the next cut, said ratchets engaging a pawl for locking the tool support in reset position, and means for automatically actuating said pressure responsive means.

4. In a machine for applying relief to the flanks of the teeth of a hob, a base, a tool support slidably mounted on said base for mounting a toolholder for movement from and to a retracted position, said toolholder adapted to retain a cutting tool therein, spring means adapted to be released to move said support to a retracted position, automatic pressure responsive means to release said spring means and compress said spring means upon returning said support from a retracted position, rotating cam means activated by said fluid responsive means to reset said cutting tool for the next cut, an electric switch adapted to be contacted to stop the machine, a pin operatively connected to said cam for contacting said switch after one revolution of said cam, and means for operating said fluid responsive means.

JAMES MARTIN.

REFERENCES CITED

The following references are of record in the file of this patent:

UNITED STATES PATENTS

| Number | Name | Date |
| --- | --- | --- |
| 1,865,528 | Lorelg | July 5, 1932 |
| 1,950,039 | Smith | Mar. 6, 1934 |
| 2,317,522 | Curtis | Apr. 27, 1943 |
| 1,429,616 | Muller | Sept. 19, 1922 |
| 1,778,769 | Olson | Oct. 21, 1930 |
| 1,584,976 | Brunton | May 18, 1926 |
| 2,387,012 | Daugherty | Oct. 16, 1945 |

FOREIGN PATENTS

| Number | Country | Date |
| --- | --- | --- |
| 562,562 | Germany | Oct. 27, 1932 |
| 501,426 | Germany | July 5, 1930 |